United States Patent

[11] 3,631,414

[72] Inventor John E. Bigelow
Niskayuna, N.Y.
[21] Appl. No. 787,699
[22] Filed Dec. 30, 1968
[45] Patented Dec. 28, 1971
[73] Assignee General Electric Company

[54] RAPID ACCESS DATA STORAGE AND RETRIEVAL SYSTEM
12 Claims, 5 Drawing Figs.

[52] U.S. Cl. ........ 340/174YC, 178/6.6 A, 340/174 TF, 340/174 VB, 340/174 M, 340/174 SC, 340/174.1 M, 350/162 R
[51] Int. Cl. ........ G11c11/14, G11c 11/42, G02b 5/18
[50] Field of Search ........ 340/174, 174.1 M, 173 LT; 350/162; 178/6.6 A

[56] References Cited

UNITED STATES PATENTS

| | | | |
|---|---|---|---|
| 3,188,615 | 6/1965 | Wilcox, Jr. | 340/174.1 |
| 3,312,955 | 4/1967 | Lamberts et al. | 340/173 |
| 3,347,614 | 10/1967 | Fuller et al. | 350/162 |
| 3,478,661 | 11/1969 | Heckscher | 95/12.20 |
| 3,508,215 | 4/1970 | Cohler et al. | 340/174 |

*Primary Examiner*—James W. Moffitt
*Attorneys*—Richard R. Brainard, Marvin Snyder, Paul A. Frank, Frank L. Neuhauser, Oscar B. Waddell and Melvin M. Goldenberg

ABSTRACT: Superimposed angularly oriented diffraction gratings are recorded on sheets of magnetic film to provide high-density data storage on each sheet, each recorded grating representing a particular binary digit. Optical readout is accomplished by diffracting a beam of monochromatic light with the gratings on any selected sheet to produce first order diffraction images in the form of spots on an output plane according to the binary digits recorded on the sheet. The locations of the spots thus formed on the output plane are indicative of data recorded on the sheet. The sheets may be stacked to provide compact, three-dimensional storage of data.

3 Sheets-Sheet 1

Inventor:
John E. Bigelow,
by Marvin Snyder
His Attorney.

Inventor:
John E. Bigelow,
by Marvin Snyder
His Attorney.

Inventor:
John E. Bigelow,
by Marvin Snyder
His Attorney.

RAPID ACCESS DATA STORAGE AND RETRIEVAL SYSTEM

This invention relates to large capacity random access magnetic memories, and more particularly to a magnetic memory in which superimposed diffraction gratings are recorded on magnetic film and read out optically.

In J. E. Bigelow application Ser. No. 717,848, filed Apr. 1, 1968 and assigned to the instant assignee, a system for storing and retrieving data in the form of unique sets of superimposed angularly oriented optical diffraction gratings is described and claimed. In the aforementioned Bigelow application, the angularly oriented diffraction images of each binary digit or bit in a set of bits to be recorded is recorded on a strip of optical recording material. This permits simultaneous readout of each bit in the set by detecting light in the diffraction image plane at the first order diffraction image location. The light is detected at angularly predetermined locations and, by employing detecting means at each of the locations, the entire set of recorded bits may be detected simultaneously.

Data storage and retrieval, as described in the aforementioned Bigelow application, is conveniently made for up to a small number of bits, such as eight. The present invention concerns a system wherein approximately $10^6$ bits may be stored in each set of superimposed diffraction gratings. Each set of superimposed diffraction gratings may conveniently be recorded in an area of about 40 square inches.

In order to provide capability to store such large numbers of bits while yet facilitating erasure and rewrite operations, it is desirable to employ other than optical means for recording the gratings. According to the present invention, the gratings are recorded magnetically; that is, by employing a magnetic film exhibiting a relatively high reflectivity to light, optically reflective diffraction gratings may be produced on the film by recording signals of different unique frequencies thereon. These signals are recorded on the film in two-dimensional fashion by use of a well-known scanning recorder such as described by R. H. Snyder in "Video Tape Recorder Uses Revolving Heads," *Electronics*, Aug. 1, 1957, pages 138–144. In the alternative, the entire film may be magnetized uniformly and then controllably demagnetized by a hologram pattern of high-intensity laser light such that the laser energy is provided in a high-power burst sufficient to heat the magnetized film locally above the Curie temperature and leave a magnetic pattern of the desired form. In either event, the reflective diffraction gratings are formed due to a change in reflection coefficient produced by the magnetic field of the film. This is the same phenomenon which produces the well-known Kerr effect. The change in reflection coefficient is most pronounced when the magnetic film is comprised of a ferromagnetic material.

Readout is performed by directing a collimated beam of light onto the magnetic film, or chip of film to be read and detecting first order diffraction images reflected from the chip. The first order images are in the form of spots of light in locations dependent upon the nature of the diffraction gratings on the chip. Only rotation and tilt of the chip need be precisely controlled, since the spot locations are independent of translation of the chip within the illuminated region. By detecting the first order images, the data stored on the chip may be read out.

Erasure may be readily accomplished by placing the chip in a demagnetizing field or by heating the entire chip above the Curie temperature. A new magnetic pattern may then be recorded on the chip. Rerecording may also be accomplished without a separate erasure operation by using a recording field of sufficiently high strength to obliterate the previously recorded data.

Accordingly, one object of the invention is to provide a high-density, rapid access data storage and retrieval system.

Another object of the invention is to provide a large capacity data storage system employing magnetic apparatus for storage of data and optical apparatus for retrieval of stored data.

Another object is to provide a large plurality of angularly oriented, reflective diffraction gratings for storage of data.

Briefly, in accordance with a preferred embodiment of the invention, data storage and retrieval apparatus comprises optical detecting means responsive to light energy in the form of spots at predetermined locations thereon, and a source of monochromatic light. A magnetic film is positioned within the region illuminated by the monochromatic light and situated to reflect the light from the surface thereof onto the optical detecting means. The surface of the film contains superimposed, angularly oriented, magnetically formed optical diffraction gratings and exhibits sufficient reflectivity to produce a response in the optical detecting means upon reflecting the monochromatic light onto the detecting means.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
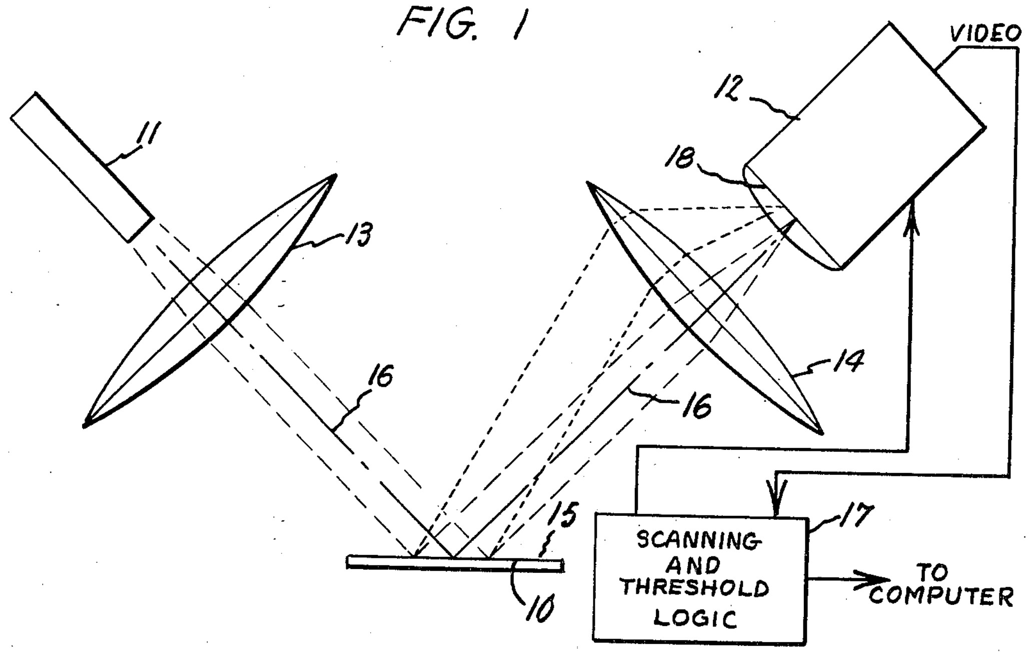
FIG. 1 is a schematic diagram illustrating readout of recorded data in accordance with the teachings of the invention.

In FIG. 1, a magnetic chip 10 is illustrated within the beam of optical energy emitted by a source 11 of monochromatic light, such as a laser. Light reflected from the surface 15 of chip 10 impinges upon the face 18 of a vidicon 12. The electron beam (not shown) within vidicon 12 is scanned across the rear of face 18 according to a predetermined pattern by scanning and threshold logic circuitry 17. Video output signals from vidicon 12 are furnished to logic circuitry 17 wherein they are quantized preparatory to utilization. The quantized video signals are thereupon furnished serially to utilization apparatus, such as the buffer memory of a computer, for example. Incident light from source 11 is collimated by a lens 13, while light reflected from chip 10 is focused by an objective lens 14 onto face 18 of vidicon 12.

Magnetic chip 10 comprises a sheet of magnetic film having an optically reflective surface 15. Suitable materials for chip 10 include metallic films such as nickel or nickel-iron alloys, since these metals are at the same time eminently suited to magnetic storage and optical reflection. Alternatively, a film of magnetic particles, such as magnetic recording tape which employs iron in a plastic binder, is suitable, provided the magnetic film is coated with a thin evaporated film of metal such as aluminum to provide high optical reflectivity.

Figure 2:
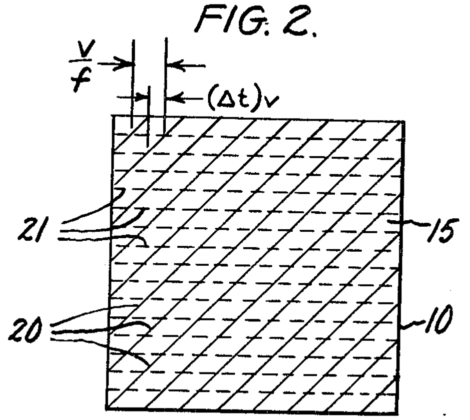
FIG. 2 depicts the diffraction gratings recorded on the magnetic film employed in the system of FIG. 1.
Figures 5, 6:
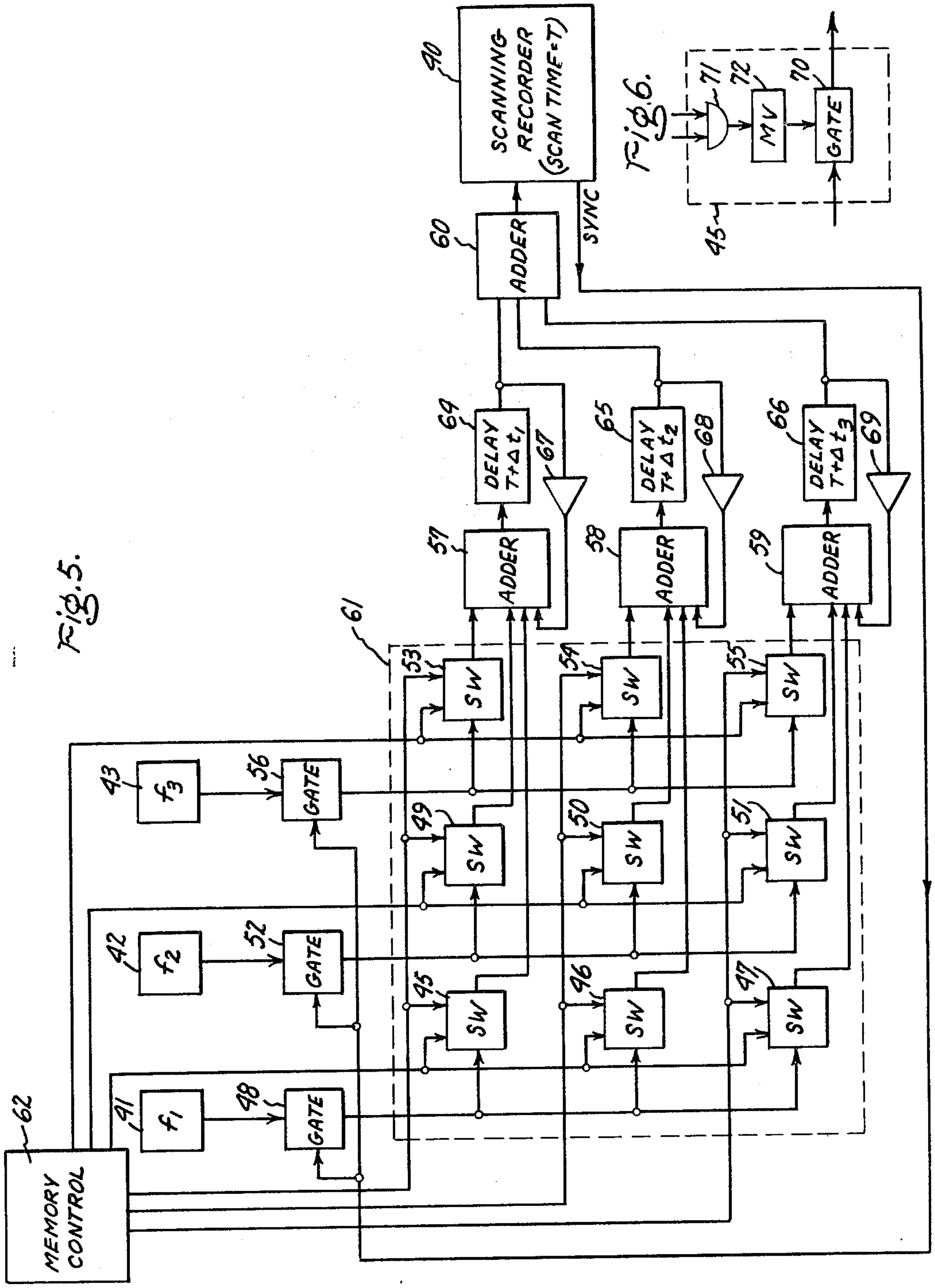
FIG. 5 is a block diagram of apparatus for recording optical diffraction gratings magnetically upon the magnetic film employed in the system of the present invention.
FIG. 6 is a block diagram illustrating the apparatus employed in each of the logic modules shown in FIG. 5.

FIG. 2 is a top view of the optically reflective surface 15 of chip 10 of FIG. 1, showing a signal pattern recorded on the chip, with dotted lines 21 representing the path on the chip scanned in raster fashion by the readout apparatus. Recording is accomplished by use of apparatus such as illustrated in FIG. 5 and described infra. For simplicity of description, the signal pattern illustrates but a single diffraction grating represented by parallel, equally spaced solid lines 20. However, it is to be understood that each chip, with length by width dimensions of about 8 inches by 5 inches, can have up to about $10^6$ superimposed diffraction gratings recorded thereon, each grating having a unique and discernible angular orientation. Superimposed angularly oriented diffraction gratings are described in detail in the aforementioned J. E. Bigelow application, Ser. No. 717,848. Accordingly, if each chip comprises a flexible base of 1 mil thickness, and if a plurality of such chips are loosely arranged in a stack 15 inches thick so as to allow 1–1½ mils thickness per sheet with a system of staggered thicker tabs to facilitate pulling desired chips out of the stack, approximately 10,000 chips can be stacked. A stack of this size results in a total memory capacity in the order of $10^{10}$ bits. By employing even thicker stacks, higher capacity memories may be achieved; for example, for a stack of chips 150 inches thick, the memory capacity is in the order of $10^{11}$ bits.

During readout operation, each set of parallel, equally spaced superimposed lines on the chip, produced by signals recorded thereon, acts as a reflective diffraction grating by virtue of the aforementioned change in reflection coefficient resulting from the recorded signals. Light diffracted by each grating produces first order images in the fashion described in the aforementioned J. E. Bigelow application, Ser. No. 717,848. These first order images form spots of light at locations displaced from optic axis 16, as shown in FIG. 1, and are produced by light directed along the dotted lines in FIG. 1. By impinging incident light upon chip 10 at a relatively low angle of incidence, modulation of the light by the recorded signal pattern is enhanced. The zero order images, produced by light reflected but undiffracted by magnetic chip 10, are formed at the intersection of optic axis 16 with face 18 of vidicon 12. Because of the nature of the diffraction gratings, each first order image spot appears at the same point on face 18 of vidicon 12 irrespective of chip translation within its plane in the illuminated region; that is, only the rotational position of the chip and any tilt of the chip must be maintained constant.

In magnetic chip 10 of FIG. 1, two parameters are required in order to define a bit address. On face 18 of vidicon 12, these parameters may be X and Y cartesian coordinates; however, in the plane of the chip, it is often more convenient to specify a different coordinate pair, such as a spatial frequency and an angular orientation of the grating lines, or a simple transformation of this information which better defines what the recording system must accomplish in order to record data on the magnetic chip. These parameters are illustrated in FIG. 2, and correspond to a wavelength defined by the expression $v/f$ in a direction along any one of scanning lines 21 and a shift in recorded signal or wave position between one scanning line and the next adjacent scanning line, which is equal to the expression $(\Delta t)v$. In the aforementioned expressions, $f$ represents the modulation frequency recorded on the chip by a magnetic scanning recorder, $v$ is the scanning velocity of the recorder, and $\Delta t$ is a time interval which determines the shift in phase of the recorded frequency in a given scanning line with respect to the preceding scanning line. Thus, the recorded wavelength controls the distance between the first order spot and the optic axis, while the shift in recorded wave position between the first and second scanning lines controls the direction of displacement of the first order spot from the optic axis.

Figure 3:
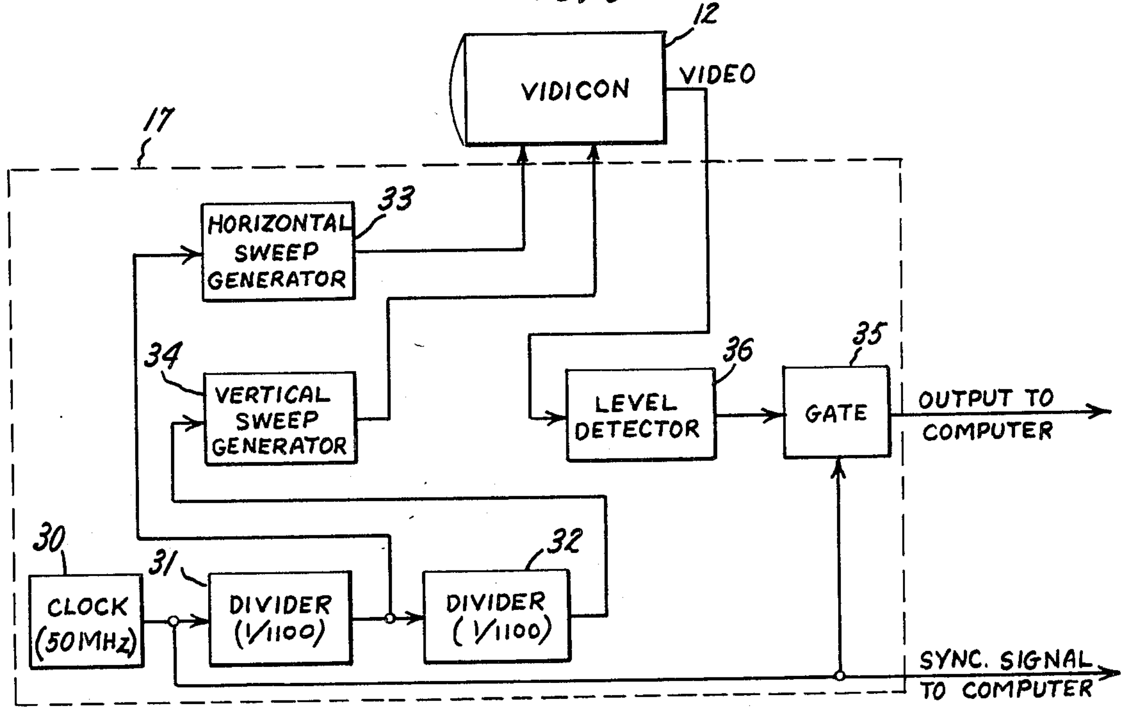
FIG. 3 is a block diagram of the scanning and threshold logic circuitry shown in FIG. 3.

FIG. 3 is a block diagram of scanning and threshold logic circuitry 17 connected to vidicon 12. Circuitry 17 is controlled by a clock pulse generator operating at a relatively high pulse-repetition rate, such as 50 mHz. Clock 30 drives a divider circuit 31, which may comprise a pulse counter. Divider 31 divides the pulse-repetition rate of clock 30 into an appropriate rate for driving a horizontal sweep generator circuit 33. Divider 31 conveniently achieves this result by dividing the pulse-repitition rate of clock 30 by a factor of 1,100. A second divider circuit 32 is driven by output pulses from divider circuit 31 and in turn drives a vertical sweep generator circuit 34. Divider 32 may comprise a circuit similar to that of divider 31 and perform a division by 1,100 upon the pulse-repetition rate of divider circuit 31.

Video output signals from vidicon 12 are furnished to an amplitude level detector circuit 36 which produces an output signal of one steady state level or another, depending upon whether the signal furnished thereto is above or below a predetermined amplitude level. Output pulses from clock 30 also control a gate circuit 35 which receives as its input signal the output signal of level detector 36. Output signals from gate 35 are furnished to utilization apparatus, such as the buffer storage of a computer.

The pulse-repitition rate of clock 30 together with the flyback times for sweep generators 33 and 34 and the divisor values of divider circuits 31 and 32 combine to produce a horizontal sweep across the face of vidicon 12 in 20 microseconds, plus an additional horizontal flyback time of 2 microseconds, and to produce a complete raster on the face of vidicon 12 in 22 milliseconds, plus an additional vertical flyback time of 2.2 milliseconds. Since a pulse is produced by clock 30 every 20 nanoseconds, each pulse having a duration in the order of 20 nanoseconds, each horizontal sweep on the face of vidicon 12 results in a scan covering 1,000 discrete locations, and each scanned raster includes 1,000 horizontal lines. Additionally, gate 35 is opened for a 10 nanosecond period once every 20 nanoseconds so as to furnish an output signal from amplitude level detector 36 to the utilization apparatus. Thus, if the amplitude of video signal furnished to level detector 36 is below the amplitude of a predetermined setting, a steady zero or low amplitude signal is passed through gate 35 to the utilization apparatus during the period in which gate 35 is open. On the other hand, if level detector 36 receives a video signal of amplitude above the predetermined setting of level detector 36, a steady high-amplitude signal is passed through gate 35 to the utilization apparatus during the interval in which gate 35 is open. In this manner the video signal is quantized so that binary ONES and ZEROS are furnished, in serial fashion, to the utilization apparatus. If desired, a sync signal may be furnished from clock 30 to the utilization apparatus so as to synchronize operation of the utilization apparatus with that of gate 35. This minimizes any ambiguities in signals furnished to the utilization apparatus by rendering the utilization apparatus nonresponsive to electrical stimuli during the intervals in which gate 35 is closed.

Figure 4:
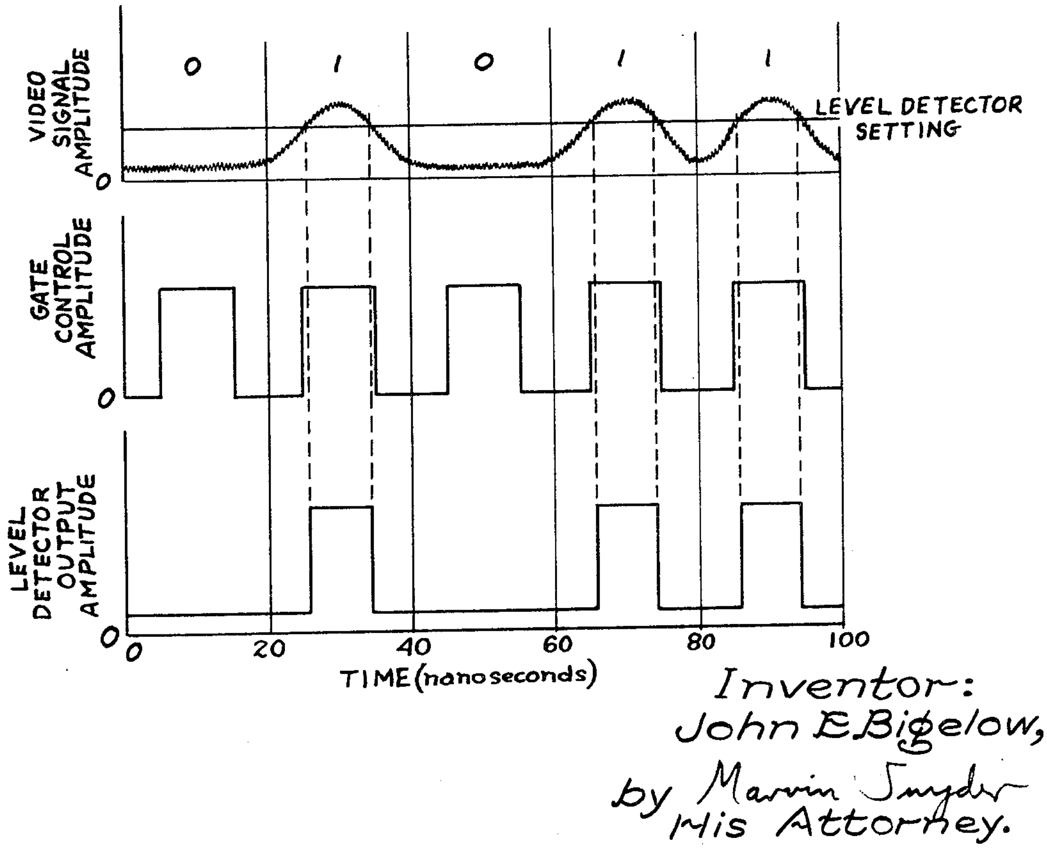
FIG. 4 is a graphical illustration to aid in the description of operation of the apparatus shown in FIG. 3.

FIG. 4 is a graphical illustration to aid in understanding operation of the circuit of FIG. 3. The gate control pulses produced by clock 30 of FIG. 3 are illustrated along a common time base with the amplitude of video signal produced by the vidicon and the amplitude of output signal produced by the level detector. The amplitude setting of the level detector is shown superimposed upon the video signal. It can be seen that during the period of each gate pulse, the level detector produces either a steady low output signal, indicative of a ZERO, due to the amplitude of video signal being below the level detector setting, or the level detector produces a steady high-output signal, indicative of a ONE, due to the amplitude of video signal being above the level detector setting.

In order to record diffraction gratings on the magnetic chip, the system illustrated in FIG. 5 may be employed. This system utilizes a scanning magnetic recorder 40 of the type which produce two-dimensional recorded signals. One type of scanning recorder employs a recording head which is revolved sequentially in a transverse direction across a magnetic tape while the tape is moved at a constant speed only fast enough to avoid overlapping of successive recorded tracks, such as described by R. H. Snyder in "Video Tape Recorder Uses Revolving Heads," *Electronics*, Aug. 1, 1957, pages 138–144. The recorder is driven by a plurality of input frequencies supplied from a plurality of frequency sources 41, 42 and 43, such as frequency generators. Although only three frequency sources are shown for simplicity of description, a large number of frequency sources are actually employed, each producing a different output frequency as indicated by the unique subscript 1, 2, and 3 to the symbol $f$ designating each of frequency sources 41, 42 and 43, respectively. For magnetic chips of the dimensions previously set forth, up to 1,000 different frequency sources may be employed. Each of frequency sources 41, 42 and 43 is coupled through gates 48, 52 and 56, respectively, to the signal input of each one of three-input switching or logic circuits, designated SW, in a respective column of logic circuits. Each of gates 48, 52 and 56 is turned on by an output signal from scanning recorder 40 immediately prior to the start of the fist scan interval T, and is turned off at the end of the first scan interval T. Thus, frequency generator 41 furnishes input signals to each of logic circuits 45, 46 and 47 through gate 48, frequency generator 42 furnishes input signals to each of logic circuits 49, 50 and 51 through gate 52, and frequency generator 43 furnishes input signals to each of logic circuits 53, 54 and 55 through gate 56. Output signals from each row of logic circuits are summed in an analog adder circuit 57, 58 and 59, respectively, and then delayed for an interval determined by delay lines 64, 65 and 66, respectively. The output signals of each of delay lines 64, 65 and 66 are returned through amplifiers 67, 68 and 69, respectively, to the input of each of adder circuits 57, 58 and 59, respectively, so as to be fed back to the input of the respective delay line. Output signals of delay circuits 64, 65 and 66 are also summed by adder circuit 60 and furnished to the active recording head of recorder 40. The logic circuits are arranged in an array 61 of rows and columns such that the number of columns is equal to the number of possible different input frequencies to be supplied to recorder 40 and the number of rows is equal to the number of possible different delay intervals to be supplied to the recorder.

Each of the logic circuits in array 61 includes two control inputs, both of which must be energized simultaneously in order for the circuit to pass the signal received from the frequency source to which it is connected. These control inputs are energized by a memory control 62 which supplies the data to be recorded by scanning recorder 40. Memory control 62 typically comprises conventional circuitry for selectively energizing discrete locations in a memory matrix. Thus, memory control 62 energizes a first one of the inputs to each logic circuit in a column of array 61 and a second one of the inputs to each logic circuit in a row of array 61, in accordance with the specific frequencies and phases, respectively, of the signal to be recorded as binary ONES, for example, This operation is performed sequentially for each logic circuit to be switched, thereby avoiding possible ambiguities in actuating the logic circuits. Those logic circuits having inputs which remain deenergized by memory control 62 represent bits of a data which are to be recorded as binary ZEROS.

Memory control 62 thus furnishes a bit of data to each of the logic circuits in array 61. A synchronizing pulse of duration T, initiated by scanning recorder 40 at the instant the initial scan by the recording head of recorder 40 is begun, then opens gates 48, 52 and 56 for an interval T. This permits application of output signals from oscillators 41, 42 and 43 to each of the logic circuits in the columns respectively connected thereto.

FIG. 6 is a block diagram which illustrates the apparatus of each of the logic circuits within array 61 of FIG. 5, as typified by logic circuit 45. This logic circuit includes a gating circuit 70 receiving a control signal from a bistable multivibrator circuit 72 which, in turn, is actuated by a two-input AND-gate 71. The inputs to AND-gate 71 are energized by the output signals from memory control 62 of FIG. 5, supplied to the appropriate row and column, respectively, of array 61. The signal input to gate 70 is received from one of frequency sources 41–43 of FIG. 5. Thus, when both inputs to AND-gate 71 are energized, multivibrator 72 is actuated to a condition which opens gate 70. Since multivibrator 72 is bistable, subsequent deenergization of AND-gate 71 leaves multivibrator 72 unaffected so that gate 70 remains open. When gates 48, 52 and 56 of FIG. 5 are thereafter opened, the signal received from the frequency source connected to gate 70 is passed on to the recording head of scanning recorder 40 of FIG. 5. However, if multivibrator 72 is not actuated by signals from memory control 62 through AND-gate 71 into a condition which furnishes a control signal to gate 70, gate 70 remains in the blocked condition, preventing any signal from the frequency source connected thereto from reaching the scanning recorder.

Operation of the system of FIG. 5 is initiated by first selectively energizing the bistable multivibrator in predetermined ones of the logic circuits in array 61. When operation of scanning recorder 40 is thereafter initiated, gates 48, 52 and 56 are opened for a time T, which is equal to the scan time of recorder 40 for a single scan. During this interval T, signals of frequencies determined by the settings of the logic circuits in array 61 are combined in adders 57, 58 and 59 and furnished to the inputs of delay circuits 64, 65 and 66.

At the end of interval T, gates 48, 52 and 56 are closed, so that the signal frequencies furnished to adder circuits 57, 58 and 59 from the respective rows of array 61 are halted. After each brief interval $\Delta t$ of differing duration $\Delta t_1$, $\Delta t_2$ and $\Delta t_3$, respectively, output signals are furnished from delay circuitry 64, 65 and 66 to adder 60 and thence to the recording head of recorder 40 for the purpose of recording a first scan across the recording medium. In addition, each output signal produced by delay circuit 64, 65 and 66 is returned through amplifier 67, 68 and 69, respectively, to the input of adder 57, 58 and 59, respectively. This results in output signals from delay circuits 64, 65 and 66 which are now delayed from the times of their initial application thereto by intervals of $2(T+\Delta t_1)$, $2(T+\Delta t_2)$ and $2(T+\Delta t_3)$, respectively and, at the final or $n^{th}$ scan across the recording medium, these delays correspond to $n(T+\Delta t_1)$, $n(T+\Delta t_2)$ and $n(T+\Delta t_3)$, respectively. These signals actuate the magnetic recording head as it passes across the tape, so that the frequencies of each of the selected individual signals are recorded on the tape. Each of the frequencies thus recorded is separately discernible on the tape, with a predetermined angular orientation depending upon the size of the $\Delta t$ interval. This procedure continues until recording is halted. Interruption of power to the recording system then resets the multivibrators of array 61 and halts recirculation of signals through delay circuits 64, 65 and 66. The magnetic tape is thereafter cut into sections of appropriate length in order to form the desired chips.

It should be noted that magnetic tape in the order of 10 mils thickness and of the desired chip dimensions may be recorded upon directly since the increased stiffness resulting from the extra thickness obviates the need for reels to maintain the tape in a taut condition during recording. Recording in this manner provides the additional advantage of facilitating alteration of the recorded data merely by reinserting the chip into the recorder and recording the newly desired information directly over the previously recorded data without a separate erasure operation. By using sufficiently high magnetic field strength in rerecording, the previously recorded data are obliterated.

As previously pointed out, there exist alternative ways of fabricating the magnetic chips employed in the apparatus of this invention. For example, magnetic chips may be magnetized uniformly and then controllably demagnetized by a hologram pattern of high-intensity laser light. By operating the laser such that the laser energy arrives in a burst of power sufficient to heat the magnetic chip locally above the Curie temperature of the magnetic film, a magnetic pattern of the desired form may be produced on the chip. The magnetic pattern thus formed results in reflective diffraction gratings of a corresponding pattern produced by the change in reflection coefficient resulting from the altered magnetic field of the film.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. Data retrieval apparatus comprising:

optical detecting means responsive to light energy in the form of spots at predetermined locations thereon;

a source of monochromatic light; and a magnetic film positioned within a region illuminated by said monochromatic light and situated to reflect said light from the surface thereof onto said optical detecting means, said film containing superimposed angularly oriented diffraction gratings on the surface thereof formed by changes in reflectivity due to the presence of a magnetic field, to produce a response in said optical detecting means upon reflection of said monochromatic light onto said detecting means.

2. The data retrieval apparatus of claim 1 including means responsive to said optical detecting means for quantizing output signals received from said detecting means.

3. The data retrieval apparatus of claim 1 wherein said magnetic film comprises a substrate layer of high coercive force and a layer of metal of high optical reflectivity coated atop said film.

4. Data storage and retrieval apparatus comprising:

an optically reflective magnetic film for recording a predetermined pattern of magnetic fields thereon, said predetermined pattern of magnetic fields forming superimposed angularly oriented optical diffraction gratings by changes in the reflectivity of said film due to said magnetic fields;

a source of monochromatic light directed onto said film at an angle displaced from the normal to said film; and transducer means responsive to first order diffraction images in the form of spots of light reflected from said film onto predetermined locations on said transducer means, said transducer means producing sequential output signals corresponding to the locations of said spots of light.

5. The data storage and retrieval apparatus of claim 4 including means responsive to said transducer means for quantizing said output signals.

6. The data storage and retrieval apparatus of claim 4 including magnetic recording means for producing two-dimensional patterns of optical diffraction gratings in the form of signals recorded on said optically reflective magnetic film.

7. The data storage and retrieval apparatus of claim 4 wherein said magnetic film comprises a substrate layer of high coercive force and a layer of metal of high optical reflectivity coated atop said film.

8. The data storage and retrieval apparatus of claim 4 including scanning recorder apparatus for recording said pattern of magnetic fields on said film, and circuit means coupled to said recorder apparatus for selectively supplying signals of predetermined frequencies to said recorder apparatus, said circuit means including delay means for selectively introducing a predetermined constant time delay in each of selected ones of said signals of predetermined frequencies.

9. Apparatus for storage of data comprising:

an optically reflective magnetic film;

scanning recorder apparatus for recording a predetermined pattern of magnetic fields forming superimposed, angularly oriented, optical diffraction gratings on said film; and circuit means coupled to said scanning recorder apparatus for selectively supplying signals of predetermined frequencies to said recorder apparatus, said circuit means including delay means for introducing any of a plurality of different constant time delays in any selected ones of said signals.

10. A process for storing digital data in the form of optical diffraction gratings comprising:

generating signals of different frequencies;

selecting a predetermined one of said signals and introducing a predetermined constant time delay therein in accordance with each bit of data to be stored; and furnishing each of said selected signals jointly to a scanning recorder for recording said signals on an optically reflective magnetic recording medium to form superimposed, angularly oriented, optical diffraction gratings.

11. A process for storing and retrieving data comprising:

recording signals of predetermined frequencies on an optically reflective magnetic recording medium, each of said signals forming an optical diffraction grating of predetermined line spacing and angular orientation by changes in the reflectivity of said medium due to the magnetically recorded signals;

producing first order diffraction images by illuminating the reflective surface of said medium with incident monochromatic light impinging on said surface; and detecting each of said first order diffraction images reflected from said surface as an indication of data stored in said recording medium.

12. The process for storing and retrieving data of claim 11 wherein said incident monochromatic light impinges on said surface at an angle displaced from the normal to said surface.

* * * * *